US010872451B2

(12) United States Patent
Sheth et al.

(10) Patent No.: US 10,872,451 B2
(45) Date of Patent: Dec. 22, 2020

(54) 3D AVATAR RENDERING

(71) Applicant: Snap Inc., Santa Monica, CA (US)

(72) Inventors: Rahul Bhupendra Sheth, Los Angeles, CA (US); Maoning Guo, Toronto (CA); William Eastcott, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 104 days.

(21) Appl. No.: 16/177,325

(22) Filed: Oct. 31, 2018

(65) Prior Publication Data

US 2020/0134898 A1 Apr. 30, 2020

(51) Int. Cl.
G06T 13/40 (2011.01)
G06T 15/04 (2011.01)
G06T 17/20 (2006.01)
G06T 19/20 (2011.01)
H04L 12/58 (2006.01)

(52) U.S. Cl.
CPC ............ G06T 13/40 (2013.01); G06T 15/04 (2013.01); G06T 17/20 (2013.01); G06T 19/20 (2013.01); H04L 51/04 (2013.01); G06T 2210/36 (2013.01); G06T 2219/024 (2013.01); G06T 2219/2008 (2013.01)

(58) Field of Classification Search
CPC ......... G06T 13/40; G06T 15/04; G06T 17/20; G06T 19/20; G06T 2210/36; G06T 2219/024; G06T 2219/008; H04L 51/04
USPC ........................................................ 345/423
See application file for complete search history.

(56) References Cited

U.S. PATENT DOCUMENTS 5,880,731 A    3/1999 Liles et al.
6,023,270 A    2/2000 Brush, II et al.
6,223,165 B1    4/2001 Lauffer
(Continued)

FOREIGN PATENT DOCUMENTS

CN    109863532 A    6/2019
CN    110168478 A    8/2019
(Continued)

OTHER PUBLICATIONS

"International Application Serial No. PCT/US2019/059129, International Search Report dated Jan. 28, 2020", 5 pgs.
(Continued)

Primary Examiner — King Y Poon
Assistant Examiner — Vincent Peren
(74) Attorney, Agent, or Firm — Schwegman Lundberg & Woessner, P.A.

(57) ABSTRACT

Aspects of the present disclosure involve a system comprising a computer-readable storage medium storing at least one program and a method for rendering an avatar. A first avatar having a first level of detail is stored in a database, the first avatar including a first plurality of components. A level of detail of each of the first plurality of components is reduced separately from each other. A second plurality of components comprising the reduced level of detail of each of the first plurality of components is stored. A request is received for the first avatar in a second level of detail that comprises a lower level of detail than the first level of detail. In response to receiving the request, the second plurality of components is assembled to generate a second avatar having the second level of detail.

20 Claims, 9 Drawing Sheets

(56) References Cited

U.S. PATENT DOCUMENTS

| | | |
|---|---|---|
| 6,772,195 B1 | 8/2004 | Hatlelid et al. |
| 6,842,779 B1 | 1/2005 | Nishizawa |
| 6,924,804 B2 * | 8/2005 | Lake ............... G06T 17/20 345/420 |
| 7,184,047 B1 * | 2/2007 | Crampton ............ G06T 17/00 345/473 |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0026698 A1 | 2/2010 | Reville et al. |
| 2010/0115426 A1 | 5/2010 | Liu et al. |
| 2010/0141663 A1 | 6/2010 | Becker et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn et al. |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2015/0206349 A1 | 7/2015 | Rosenthal et al. |
| 2016/0134840 A1 | 5/2016 | Mcculloch |
| 2016/0234149 A1 | 8/2016 | Tsuda et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Deusen et al. |
| 2017/0310934 A1 | 10/2017 | Du et al. |
| 2017/0312634 A1 | 11/2017 | Ledoux et al. |

(56) References Cited

U.S. PATENT DOCUMENTS

| | | |
|---|---|---|
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0188920 A1 | 6/2019 | Mcphee et al. |

FOREIGN PATENT DOCUMENTS

| | | |
|---|---|---|
| EP | 2184092 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | 2012139276 | 10/2012 |
| WO | WO-2013027893 A1 | 2/2013 |
| WO | 2013152454 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |
| WO | WO 2020092745 A1 | 5/2020 |

OTHER PUBLICATIONS

"International Application Serial No. PCT/US2019/059129, Written Opinion dated Jan. 28, 2020", 9 pgs.

* cited by examiner

400

```
┌─────────────────────────────────────────┐
│ STORE IN A DATABASE A FIRST AVATAR       │
│ HAVING A FIRST LEVEL OF DETAIL INCLUDING │─401
│ A FIRST PLURALITY OF COMPONENTS          │
└─────────────────────────────────────────┘
                    │
                    ▼
┌─────────────────────────────────────────┐
│ REDUCE A LEVEL OF DETAIL OF EACH OF THE  │
│ FIRST PLURALITY OF COMPONENTS            │─402
│ SEPARATELY FROM EACH OTHER               │
└─────────────────────────────────────────┘
                    │
                    ▼
┌─────────────────────────────────────────┐
│ STORE A SECOND PLURALITY OF COMPONENTS   │
│ COMPRISING THE REDUCED LEVEL OF DETAIL   │─403
│ OF EACH OF THE FIRST PLURALITY OF        │
│ COMPONENTS                               │
└─────────────────────────────────────────┘
                    │
                    ▼
┌─────────────────────────────────────────┐
│ RECEIVE A REQUEST FOR THE FIRST AVATAR   │
│ IN A SECOND LEVEL OF DETAIL THAT         │
│ COMPRISES A LOWER LEVEL OF DETAIL THAN   │─404
│ THE FIRST LEVEL OF DETAIL                │
└─────────────────────────────────────────┘
                    │
                    ▼
┌─────────────────────────────────────────┐
│ ASSEMBLE THE SECOND PLURALITY OF         │
│ COMPONENTS TO GENERATE A SECOND AVATAR   │─405
│ HAVING THE SECOND LEVEL OF DETAIL IN     │
│ RESPONSE TO RECEIVING THE REQUEST        │
└─────────────────────────────────────────┘
```

*FIG. 4*

3D AVATAR RENDERING

TECHNICAL FIELD

The present disclosure relates generally to avatar rendering and more particularly to reducing complexities of avatar rendering.

BACKGROUND

Avatars are widely used across many different applications with different resource needs (e.g., different processing power and storage requirements). For example, messaging applications use less device resources (e.g., less storage) than gaming applications, making more of the resources available for processing the avatars. This allows such messaging applications to provide avatars with a rich set of features with minimal impact on the user experience. Gaming applications, on the other hand, use a large amount of resources which need to be shared with avatar processing. Gaming applications therefore typically need to balance resource distribution between the game itself and avatar processing.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings, in which:

FIGS. 4-5 are flowcharts illustrating example operations of an avatar processing system, according to example embodiments.

DETAILED DESCRIPTION

Figure 1:
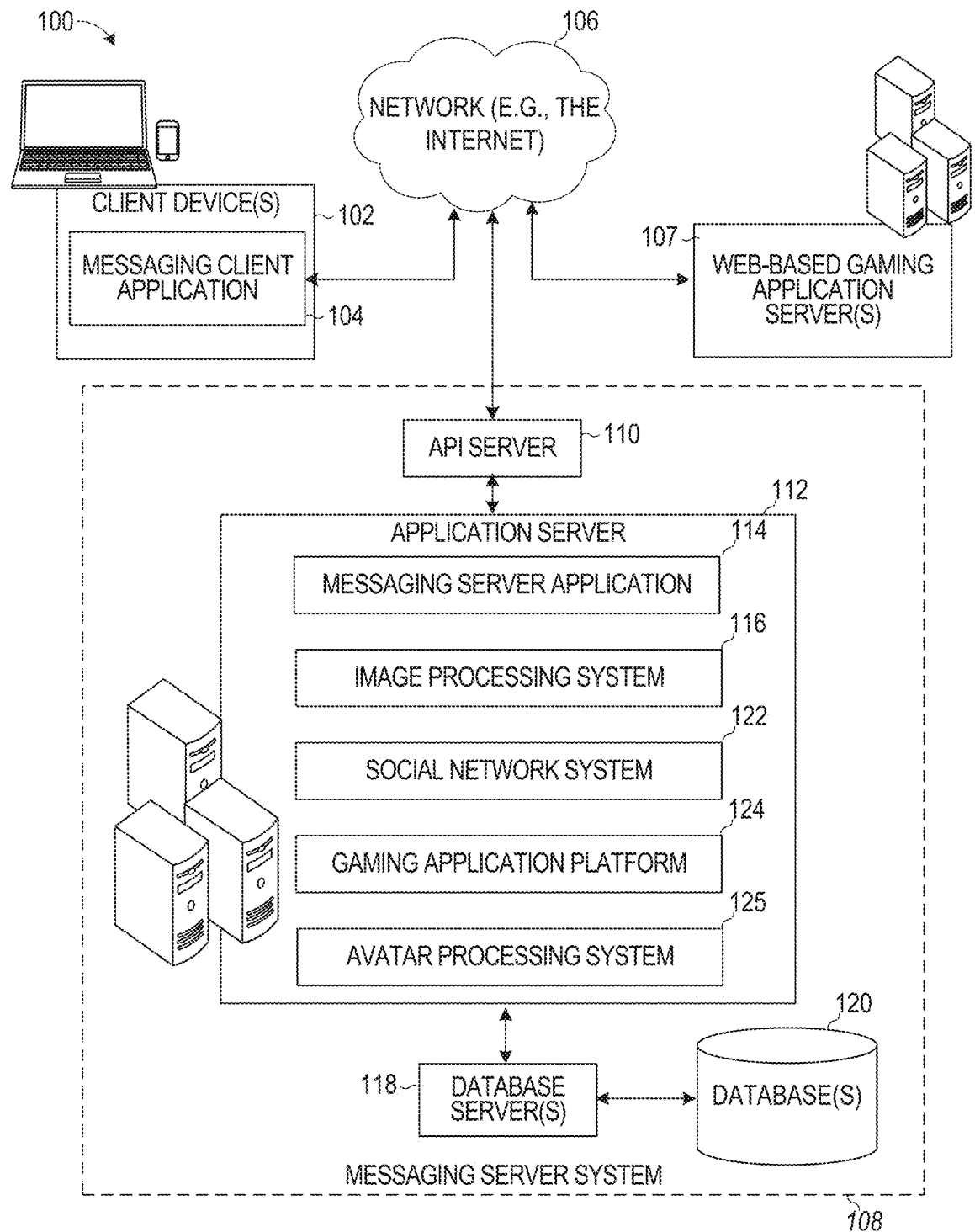
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Incorporating avatars into applications greatly enhances the overall user experience. This is especially true in multiplayer video games where users are interacting and communicating with each other. Namely, using avatars to represent the users in the video games makes communicating and playing more fun and interesting for the players. As implementations of such games on mobile devices, which have limited resources available, grows in popularity, application developers seek to improve the graphics processing techniques used to incorporate the avatars into the games. Particularly, application developers seek ways to incorporate the avatars without sacrificing the user experience or introducing lag.

One such technique used by developers to incorporate avatars into the games involves reducing the level of detail of the avatars as a whole (e.g., reducing the visual quality of the avatars). While this technique makes more of the graphics engine resource of the mobile device available to the game, reducing the level of detail of the avatar as a whole still requires complex graphics processing operations related to 3D modeling to be performed. This limits the application of the technique to devices that have a large amount of available resources or to games that incorporate a small number of avatars (e.g., a single avatar). Namely, this technique may not be effective when applied to large multiplayer video games where many avatars need to be incorporated (e.g., eight avatars are incorporated), particularly in mobile device.

The disclosed techniques improve the functionality of gaming application software and systems by reducing the amount of resources needed to incorporate multiple avatars (e.g., eight avatars) into a given application (e.g., a game). Particularly, the disclosed techniques reduce the level of detail of components of an avatar on a component-by-component basis. Avatars are typically constructed by combining various components (e.g., a rig, a geometric model, and textures). The rig includes a skeleton which has a number of bones or parts and represents how the different bones or parts interact with each other during animation. The geometric model is the three-dimensional surface representation of the avatar and can be referred to as a skin or mesh. The three-dimensional (3D) model represents a physical body using a collection of points in 3D space, connected by various geometric entities such as triangles, lines, and curved surfaces; further, each bone in the skeleton is associated with some portion of the geometric model. The textures of the avatar include more detailed features of the geometric model such as the skin color, hair color, glasses, etc. According to the disclosed embodiments, to reduce the amount of resources needed to incorporate multiple avatars, the number of bones in a skeleton of the avatar can be reduced separately (e.g., one at a time or in parallel using different processing elements) from the number of triangles in the geometric model of the avatar. Further, the bones in the rig corresponding to the facial hair, hat, head hair or glasses are embedded with the facial hair, hat, head hair, or glasses textures separately from the bones in the rig corresponding to the head or outfit textures of the avatar.

When a given application requests an avatar having certain components with a reduced level of detail, the already reduced level of detail components are retrieved and assembled into the requested avatar. This approach significantly reduces the overall resource requirements (e.g., processing and storage resource) an application needs to incorporate the avatar. Namely, unlike the conventional approach, in which the application has to reduce the level of detail of the avatar as a whole (e.g., during rendering and incorporation of the avatar), the application according to the disclosed embodiments simply requests that a server retrieve and assemble previously reduced level of detail components into an avatar to provide to the application. This enables multiple avatars (e.g., eight avatars) to be rendered and animated simultaneously for presentation to a user in a given game.

In certain embodiments, animation processing of the avatar is further optimized to make more of the processing and storage resources available to the application (e.g., the game) allowing for many more avatars to be incorporated. Specifically, according to the disclosed embodiments, animating an expression of the avatar (e.g., animating a change in expression of the avatar from happy to sad) is performed by retrieving a sequence of facial textures (e.g., a facial texture with the sides of the lips curved up, a facial texture with the sides of the lips straight, and a facial texture with the sides of the lips curved down) in the reduced level of detail that corresponds to the animated expression. The facial textures are assembled one at a time into the avatar in the reduced level of detail and swapped according to the sequence to animate the desired expression.

FIG. 1 is a block diagram showing an example messaging system 100 for exchanging data (e.g., messages and associated content) over a network 106. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

Each messaging client application 104 is also able to communicate with one or more web-based gaming application server(s) 107. Each web-based gaming application server 107 hosts an HTML5-based game (or any other suitable web-based or markup-language-based game). Particularly, the messaging client application 104 launches a web-based game by accessing the HTML5 file from the web-based gaming application server 107 associated with the game. In certain embodiments, the games hosted by web-based gaming application server 107 are programmed in JavaScript leveraging a software development kit (SDK) stored on the gaming application platform 124 provided by the messaging server system 108. The SDK includes application programming interfaces (APIs) with functions that can be called or invoked by the web-based gaming application. In certain embodiments, the gaming application platform 124 includes a JavaScript library that provides a given gaming application access to certain user data of the messaging client application 104. HTML5 is used as an example technology for programming games, according to some embodiments, but games programmed based on other technologies can be used.

In order to integrate the functions of the SDK into the game, the SDK is downloaded by the web-based gaming application server 107 from the messaging server system 108 or is otherwise received by the web-based gaming application server 107. Once downloaded or received, the SDK is included as part of the application code of the web-based game. The code of the web-based game can then call or invoke certain functions of the SDK to integrate features of the messaging client application 104 into the web-based gaming application. Some of the functions and functionality of the SDK, which the web-based gaming application and the messaging client application 104 can call, are discussed in detail in commonly-owned, commonly-assigned Alexander R. Osborne et al., U.S. patent application Ser. No. 16/177,335, filed Oct. 31, 2018, entitled "MESSAGING AND GAMING APPLICATIONS COMMUNICATION PLATFORM," which is hereby incorporated by reference.

As an example, the user's avatar from the messaging application may be made available to the gaming application in response to the gaming application invoking a fetch-avatar-image function. Specifically, the gaming application may determine a need to include a user's avatar next to score information presented in the gaming application. In this scenario, the gaming application, after being launched, invokes the fetch-avatar-image function, which passes a message to the messaging application with the user's identification information. The messaging application then generates a response message that includes an image representing the user's avatar obtained from the messaging application (or a link to the avatar image) and provides the response to the gaming application through the gaming application platform 124. The gaming application then incorporates the user's avatar by displaying the avatar in the game interface.

In certain embodiments, the game may request via the SDK an avatar having a particular level of detail (e.g., a second level of detail that is lower than a first level of detail). In such cases, the game may specify components (e.g., textures including face and body textures) of an avatar along with a given level of detail. The gaming application platform 124 may process the request and retrieve components previously generated in the requested level of detail corresponding to the requested components. For example, the gaming application platform 124 may communicate with avatar processing system 125 to obtain and generate a given avatar having the requested components in the requested level of detail. The avatar processing system 125 may assemble the requested components in the requested level of detail into an avatar and provide to the gaming application, via the gaming application platform 124, the requested avatar in the requested level of detail.

In some embodiments, the avatar processing system 125 stores avatar components in two or more levels of detail. In some embodiments, avatar processing system 125 stores an assembled avatar, having a given identifier, in a first level of detail and each component of the assembled avatar in a second level of detail separately from the assembled avatar. For example, the avatar processing system 125 stores an avatar rig (skeleton) in a first level of detail having 216 bones and the same avatar rig in a second level of detail having 16 bones. Alternatively, the avatar processing system 125 stores the complete avatar already assembled in the first level of detail having the avatar rig and all other components of the avatar in the first level of detail and separately stores only the rig portion of the avatar in the second level of detail. The avatar processing system 125 stores an avatar model in a first level of detail having 10,000 triangles and the same model of the avatar in a second level of detail having 2000 triangles. Alternatively, the avatar processing system 125 stores the complete avatar already assembled in the first level of detail having the avatar model in the first level of detail and separately stores only the model portion of the avatar in the second level of detail. The avatar processing system 125 stores textures (e.g., facial hair, facial features, outfits, hat, glasses, etc.) of an avatar in a first level of detail having a full set of blendshapes and rich level of detail and the same textures in a second level of detail having minimal geometry and minimal level of detail. Alternatively, the avatar processing system 125 stores the complete avatar already assembled in the first level of detail having the textures in the first level of detail and separately stores only the textures of the avatar in the second level of detail. Namely, the textures in the first level of detail of the avatar are not stored separately from the assembled avatar in the first level of detail. Upon receiving a request, the avatar processing system 125 assembles an avatar (e.g., in a second level of detail) by retrieving a rig, model and textures corresponding to the second level of detail and assembling the individual components into the complete avatar in the second level of detail.

In some embodiments, the level of detail of each avatar component is reduced by the avatar processing system 125 separately from other avatar components. For example, the avatar processing system 125 retrieves the rig having 216 bones of a given avatar and reduces the level of detail of the rig to 16 bones separately from reducing the level of detail of the avatar model and/or textures of the avatar. The rig in the reduced second level of detail may be stored separately from the rig in the first level of detail. In some implementations, the rigs in both levels of detail may be associated with a same avatar reference or identifier. This allows a given application to request an avatar in a given level of detail by specifying an identifier of the avatar without having to specifically identify the lower level of detail rig corresponding to the requested avatar. In some embodiments, nomenclature of the rig pieces is preserved between the first and second levels of detail. Namely, the name of the head joint that is common to both the rigs in the first and second levels of detail may be kept the same. In this way, the same process for animating a rig having 216 bones can be used to animate a rig having 16 bones.

In some implementations, portions of the avatar rig in the second level of detail are separately associated with textures. For example, the head joint of the rig in the second level of detail is associated with facial hair, head hair, hats and glasses while the full rig of the avatar is associated with outfits and heads. This allows the avatar processing system 125 to quickly and efficiently assemble a given avatar in a second level of detail that is lower in detail than the avatar in a first level of detail by picking and choosing separate components of the avatar that are previously generated.

In some embodiments, the avatar processing system 125 retrieves a model of a given avatar and reduces the level of detail of the model separately from reducing the level of detail of the avatar rig and/or textures of the avatar. For example, the avatar processing system 125 retrieves a model of a given avatar having 10,000 triangles and reduces the level of detail of the model to 2000 triangles. In some implementations, the avatar processing system 125 receives user input specifying the number of triangles and vertices for the second level of detail. In response to receiving the user input, the avatar processing system 125 automatically retrieves the model of the avatar in the first level of detail and generates the model in the second level of detail having the number of triangles and vertices specified by the user input. The model in the reduced second level of detail may be stored separately from the model in the first level of detail. In some implementations, the models in both levels of detail may be associated with a same avatar reference or identifier. This allows a given application to request an avatar in a given level of detail by specifying an identifier of the avatar without having to specifically identify the lower level of detail model corresponding to the requested avatar.

In some embodiments, the avatar processing system 125 retrieves one or more textures of a given avatar and reduces the level of detail of the retrieved textures separately from reducing the level of detail of the avatar rig and/or model of the avatar. For example, the avatar processing system 125 retrieves clothing, body, face, facial hair and/or head hair in a first level of detail and reduces the level of detail by downsampling, resizing and quantizing the clothing, body, face, facial hair and/or head hair. The textures in the reduced second level of detail may be stored separately from the textures in the first level of detail. In some implementations, the textures in both levels of detail may be associated with a same avatar reference or identifier. This allows a given application to request an avatar in a given level of detail by specifying an identifier of the avatar without having to specifically identify the lower level of detail textures corresponding to the requested avatar.

In some embodiments, the avatar processing system 125 may store a newly assembled avatar in the requested level of detail for future requests. For example, the avatar processing system 125 may receive a request for an avatar having a specified level of detail (a second level of detail that is lower than a first level of detail). The avatar processing system 125 may determine whether the components of the avatar having the specified level of detail have previously been assembled and stored. In response to determining that the requested avatar having the specified level of detail components has been previously assembled and stored, the avatar processing system 125 may retrieve the previously assembled avatar and provide to the game via the gaming application platform 124 the avatar in the requested level of detail. In response to determining that the requested avatar has not been previously assembled and stored, the avatar processing system 125 may retrieve each component specified in the request that is in the specified level of detail and assemble the components into an avatar. The avatar processing system 125 may then return to the game the assembled avatar in the specified level of detail.

The SDK stored on gaming application platform 124 effectively provides the bridge between the web-based gaming application and the messaging client application 104. This provides the user with a seamless experience of communicating with their friends on the messaging client application 104, preserving the look and feel of the messaging client application 104 while playing a web-based gaming application. To bridge the web-based gaming application and the messaging client application 104, in certain embodiments, the SDK facilitates communication between the web-based gaming application server 107 and the messaging client application 104. In certain embodiments, a WebViewJavaScriptBridge running on a client device 102 establishes two one-way communication channels between the web-based gaming application and the messaging client application 104. Messages are sent between the web-based gaming application and the messaging client application 104 via these communication channels asynchronously. Each SDK function invocation is sent as a message, and callback for each SDK function is implemented by constructing a unique callback identifier and sending a message with that callback identifier.

In certain embodiments, each web-based gaming application server 107 provides the HTML5 file corresponding to the web-based gaming application to the messaging server system 108. The messaging server system 108 can add a visual representation of the game in the messaging client application 104. The visual representation can be a box art of the gaming application or just text with the title of the gaming application. The box art (or cover art) includes an artwork as an illustration or photograph that visually identifies, describes, and/or promotes the gaming application. The box art is artistically connected to the gaming application and is created with art by the creator of the gaming application. Once the user selects the visual representation or instructs the messaging client application 104 through a GUI of the messaging client application 104 to launch the game (as discussed below), the messaging client application 104 obtains the HTML5 file and initiates all the resources necessary to launch the game. In some cases, the messaging client application 104 accesses the corresponding web-based gaming application server 107 to launch the game.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 and the web-based gaming application server 107 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the messaging server application 114, and for possible access by another messaging client application 104; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, gaming application platform 124, and avatar processing system 125. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends.

The application server 112 is communicatively coupled to a database server 118, which facilitates access to a database 120 in which is stored data associated with messages processed by the messaging server application 114.

Figure 2:
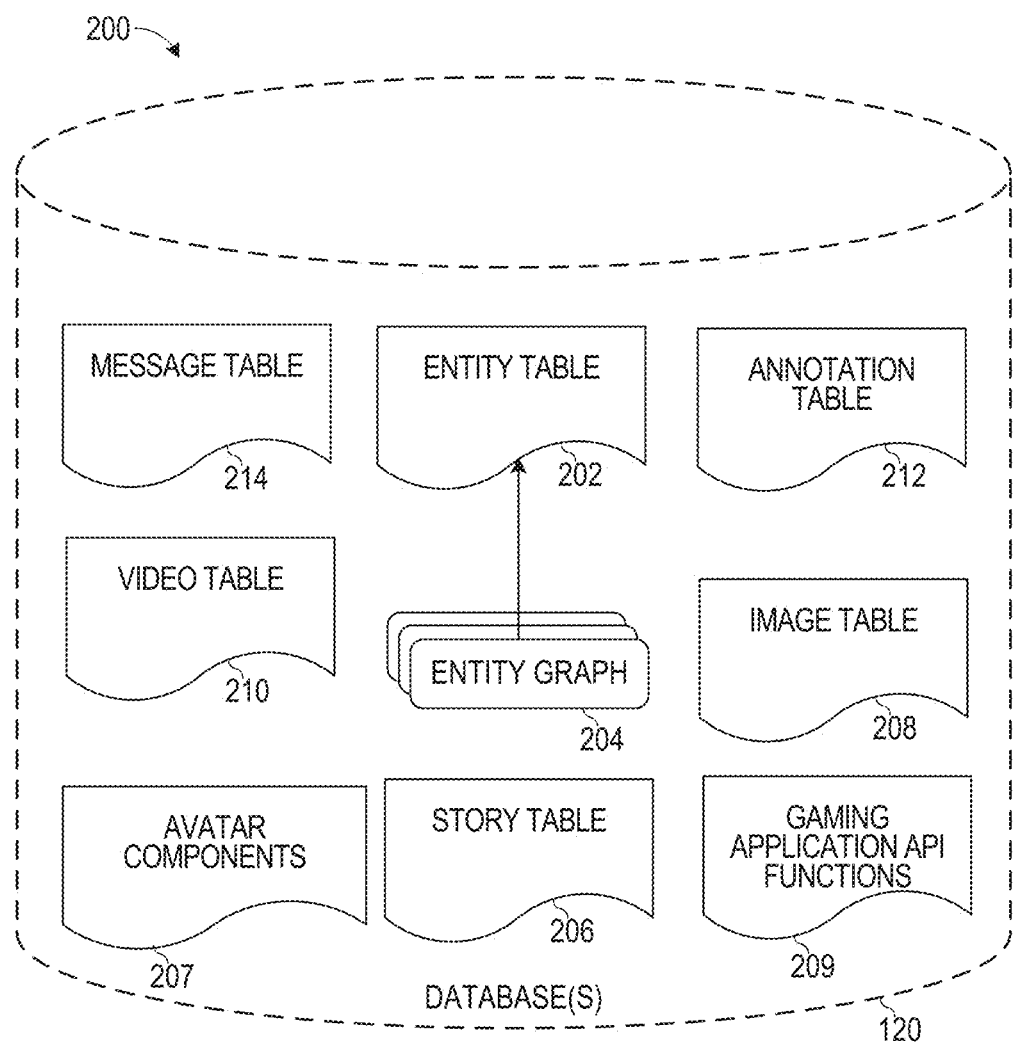
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s). Information from message table 214 may be provided in limited form and on a limited basis to a given web-based gaming application based on functions of the messaging client application 104 invoked by the web-based gaming application.

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Avatar components 207 stores various components in different levels of detail. Avatar processing system 125 accesses an avatar component in a first level of detail that is stored in avatar components 207, reduces the level of detail, and stores the avatar component in the second level of detail in avatar components 207. Avatar components 207 may store previously assembled avatars in first and/or second levels of detail. Avatar components 207 stores an association between the first and second levels of detail of various components with their corresponding avatars. For example, a given avatar may be associated with both the first level of detail components and the second level of detail components. Namely, an avatar skeleton in first and second levels of detail may be associated with a common avatar identifier.

Gaming application API functions 209 stores a number of functions of the SDK stored on gaming application platform 124. The gaming application API functions 209 stores the code that is executed when a given function of the API is invoked by the web-based gaming application, or the messaging client application 104, or messaging application emulator 105.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story. The UI of the messaging client application 104 may include selectable options to enable a sending user to add a modified video clip that has a virtual object to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
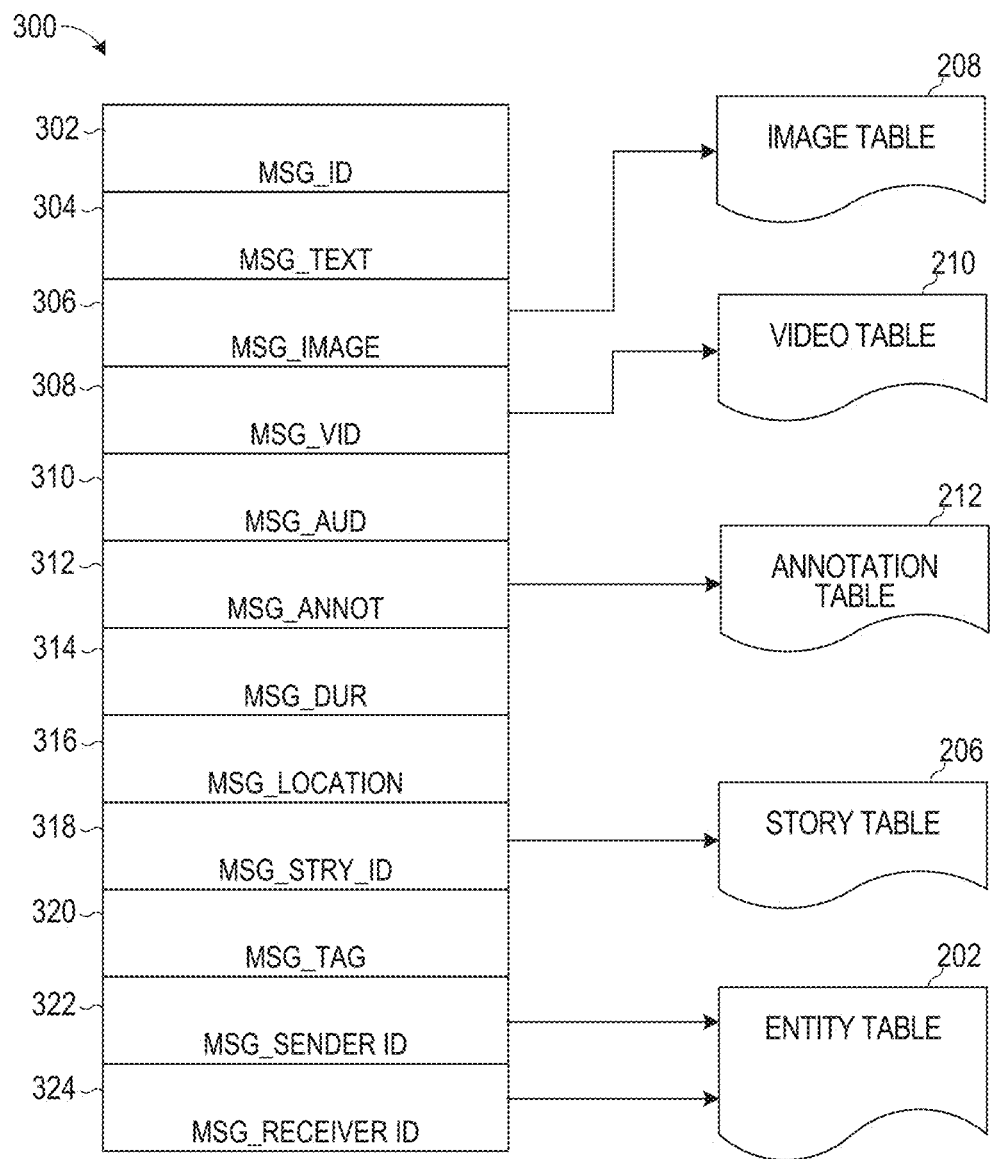
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

A message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 5:
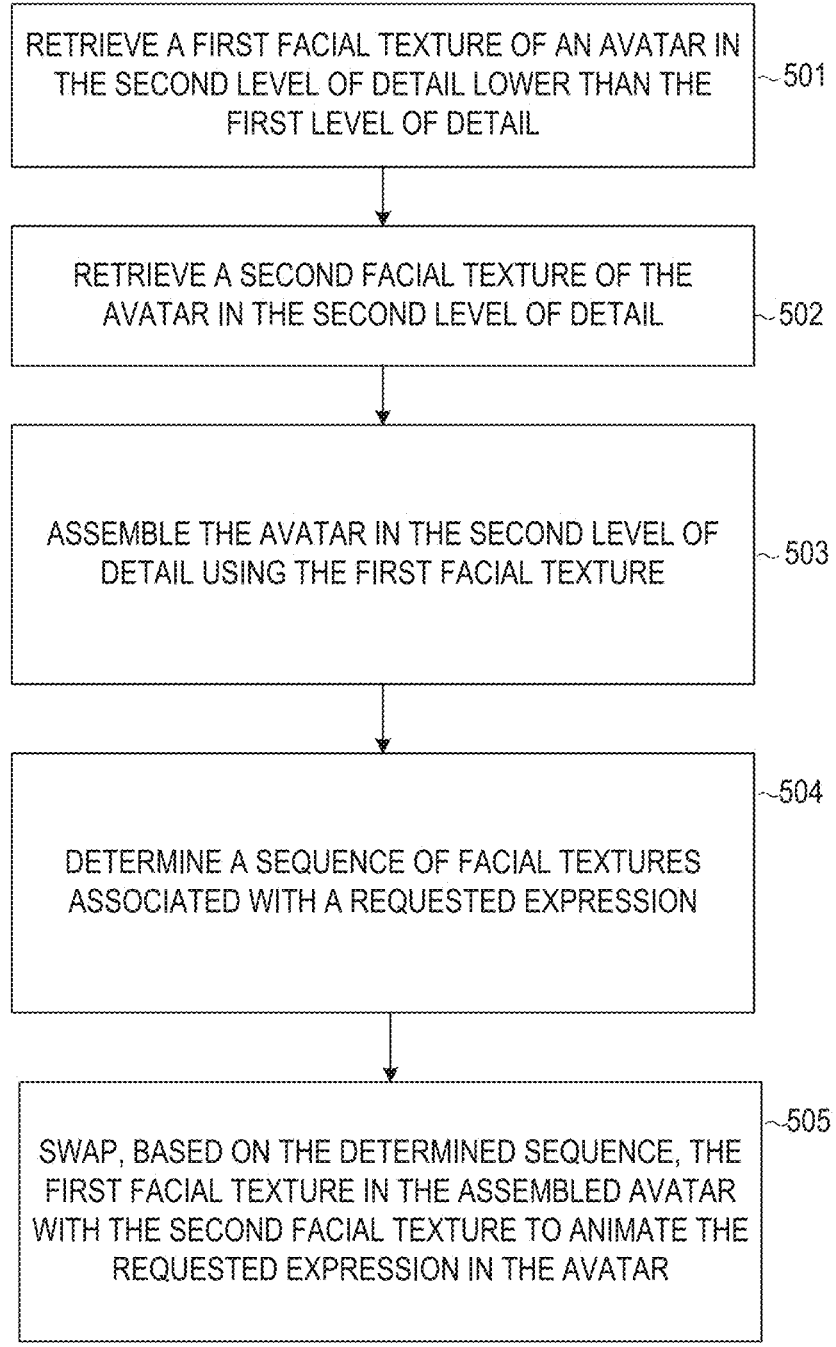

FIGS. 4-5 are flowcharts illustrating example operations of the messaging application in performing processes 400-500, according to example embodiments. The processes 400-500 may be embodied in computer-readable instructions for execution by one or more processors such that the operations of the processes 400-500 may be performed in part or in whole by the functional components of the messaging server system 108; accordingly, the processes 400-500 are described below by way of example with reference thereto. However, in other embodiments at least some of the operations of the processes 400-500 may be deployed on various other hardware configurations. The processes 400-500 are therefore not intended to be limited to the messaging server system 108 and can be implemented in whole, or in part, by any other component.

At operation 401, a first avatar having a first level of detail including a first plurality of components is stored in a database. For example, avatar processing system 125 stores an avatar in a first level of detail in avatar components 207. The avatar may be stored in avatar components 207 in already assembled form in which all of the avatar components (e.g., rig, model, and textures) in the first level of detail are already combined. Alternatively, the components in the first level of detail of the avatar may be stored separately to be assembled into a complete avatar at a later time.

At operation 402, a level of detail of each of the first plurality of components is reduced separately from each other. For example, avatar processing system 125 obtains a first component from the first avatar (e.g., a rig) and reduces the level of detail of the obtained first component separately from a second component (e.g., an avatar model). Reducing the level of detail of all the components of the first avatar generates a second plurality of components in a second level of detail. For example, the avatar rig (skeleton) in a first level of detail having 216 bones can be reduced to an avatar rig in a second level of detail having 16 bones. As another example, the avatar model in a first level of detail having 10,000 triangles can be reduced to a model in a second level of detail having 2000 triangles.

At operation 403, a second plurality of components is stored comprising the reduced level of detail of each of the first plurality of components. For example, avatar processing system 125 stores the reduced level of detail components as the second plurality of components in avatar components 207. Avatar processing system 125 associates the reduced level of detail components with the same avatar identifier in the first level of detail. For example, the avatar in the first level of detail may be associated with a given unique identifier (e.g., a unique name or number) and the reduced level of detail components may be associated with the same unique identifier. In particular, a database may store a reference to the reduced level of detail components for the unique avatar identifier and may store a reference to the assembled avatar in the first level of detail.

At operation 404, a request for the first avatar in a second level of detail that comprises a lower level of detail than the first level of detail is received. For example, a game may request from gaming application platform 124 requests a given avatar in a specified (e.g., reduced) level of detail. The game may provide an identifier of the avatar and/or identifiers of each component in a list of components of an avatar being requested. In some implementations, the game may need to simultaneously present multiple avatars (e.g., eight different avatars). In this case, the game may request each of the avatars in a second level of detail from the gaming application platform 124. This allows the game to quickly and efficiently present and animate multiple three-dimensional avatars while preserving device resources for processing the game. In some implementations, the game may present simultaneously certain avatars in a first level of detail and certain other avatars in a second level of detail, for example, based on priority and/or based on identities of users. For example, a leader or the user may have an avatar presented among other avatars in a first level of detail that is greater than the level of detail in which the other avatars are presented. The game may provide identities of all the avatars it needs to present simultaneously to gaming application platform 124 including a specific level of detail of each avatar. The gaming application platform 124 may then communicate with the avatar processing system 125 to retrieve the avatars in the different levels of detail for the game to simultaneously present.

At operation 405, the second plurality of components is assembled to generate a second avatar having the second level of detail in response to receiving the request. For example, the gaming application platform 124 may communicate with avatar processing system 125 the request for the avatar in the reduced level of detail. Avatar processing system 125 retrieves the components in the requested level of detail (e.g., the second level of detail) and assembles them into an avatar that is in a second level of detail. The avatar processing system 125 provides the avatar in the second level of detail to the gaming application platform 124, which then provides the requested avatar to the game.

In some embodiments, to further optimize avatar animation, the game and the messaging application may animate the avatar expressions by swapping different facial feature textures according to an expression sequence. For example, to animate a given avatar in a second level of detail from happy to sad, the avatar processing system 125 may select three different facial textures (e.g., one with sides of the lips raised, a second with sides of the lips straight, and a third with sides of the lips pointing down). The avatar processing system 125 may determine an expression sequence to represent the expression of the avatar going from happy to sad. The avatar processing system 125 may provide to the game the three different facial textures with instructions as to the sequence for swapping the facial textures to change the expression from happy to sad (e.g., first present the facial texture with the sides of the lips raised, then swap that facial texture with the facial texture having the sides of the lips straight followed by the facial texture where the lips point down).

At operation 501, a first facial texture (e.g., an avatar component) of an avatar is retrieved in the second level of detail lower than the first level of detail. For example, the avatar processing system 125 retrieves the facial texture featuring sides of the lips raised.

At operation 502, a second facial texture of the avatar is retrieved in the second level of detail. For example, the avatar processing system 125 retrieves the facial texture featuring sides of the lips pointing down.

At operation 503, the avatar is assembled in the second level of detail using the first facial texture. For example, the avatar processing system 125 assembles the avatar with the facial texture featuring the sides of the lips raised. In some embodiments, the avatar may have a three-dimensional head and/or body and the facial texture may be two-dimensional. The three-dimensional avatar may be assembled using the two-dimensional facial texture to reduce processing and storage resource requirements of a given device.

At operation 504, a sequence of facial textures associated with a requested expression is determined. For example, the avatar processing system 125 may receive a request from the game to animate an expression from happy to sad. In response, the avatar processing system 125 identifies, from a collection or plurality of expression sequences, an expression sequence for facial textures. The sequence may identify the first facial texture in a first position followed by the second facial texture in the last position.

At operation 505, the first facial texture in the assembled avatar is swapped with the second facial texture based on the determined sequence to animate the requested expression in the avatar. For example, to animate the avatar expression from happy to sad, the avatar processing system 125 first presents the facial texture in which the sides of the lips are raised (e.g., the first facial texture) and then the avatar processing system 125 swaps the first facial texture with the second facial texture in which the sides of the lips point down. By swapping the facial textures, the processing resources of the device are reduced to a simple swap operation. This avoids having to dedicate processing resources to render the avatar as a whole from having one expression to another, which significantly improves performances and computing efficiency. This allows multiple avatars having reduced level of detail presented and rendered simultaneously in a game.

Figure 6:
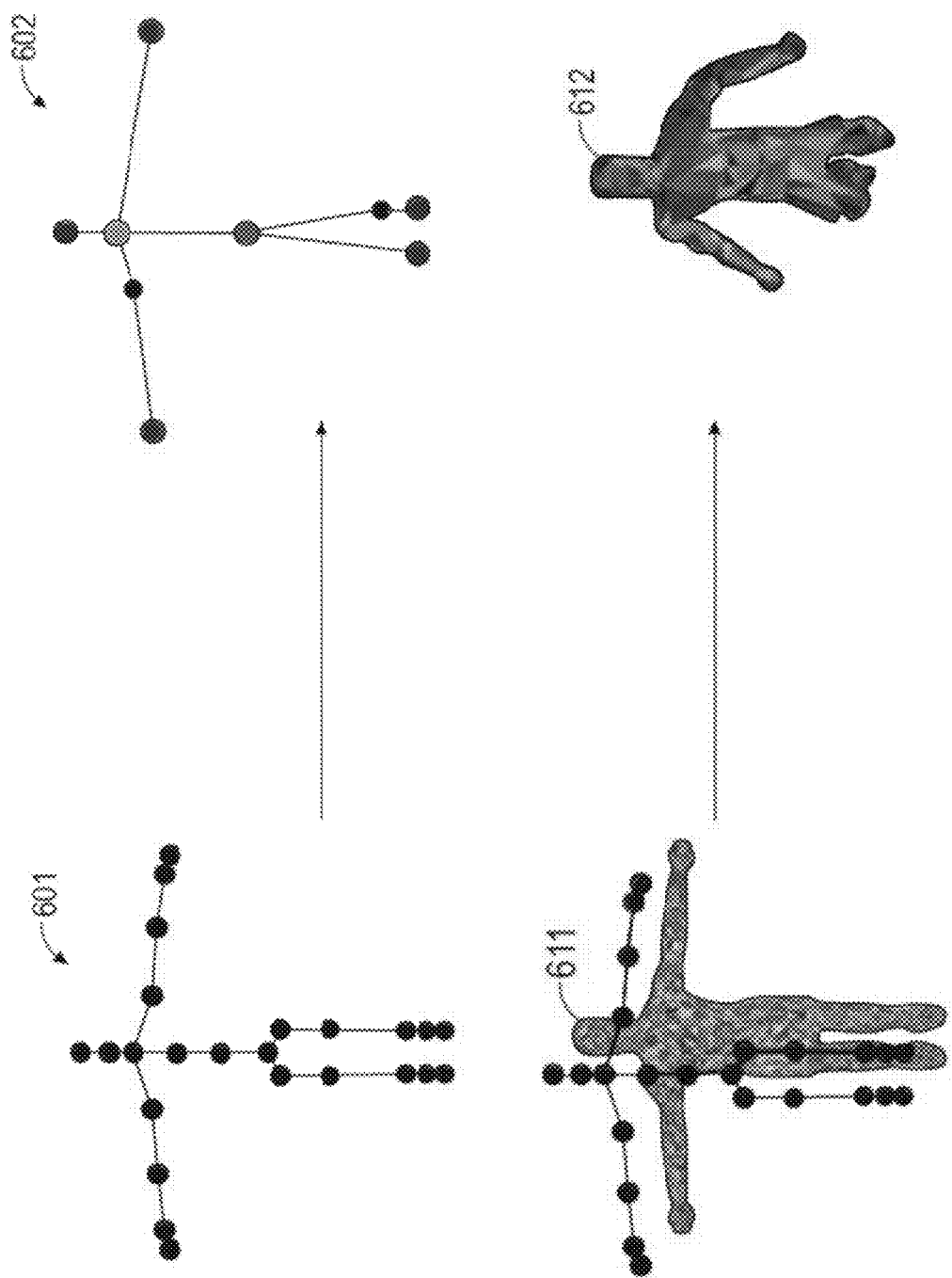
FIG. 6 shows illustrative components of an avatar in first and second levels of detail according to some embodiments.

FIG. 6 shows illustrative components of an avatar in first and second levels of detail according to some embodiments. For example, the components shown in FIG. 6 include an avatar rig 601 and an avatar model 611. As shown in FIG. 6, an avatar rig 601 in a first level of detail (e.g., having 216 bones) is reduced to a rig 602 in a second level of detail (e.g., having 16 bones). As shown in FIG. 6, an avatar model 611 in a first level of detail (e.g., having 10.000 triangles) is reduced to an avatar model 612 in a second level of detail (e.g., having 2000 triangles).

Figure 7:
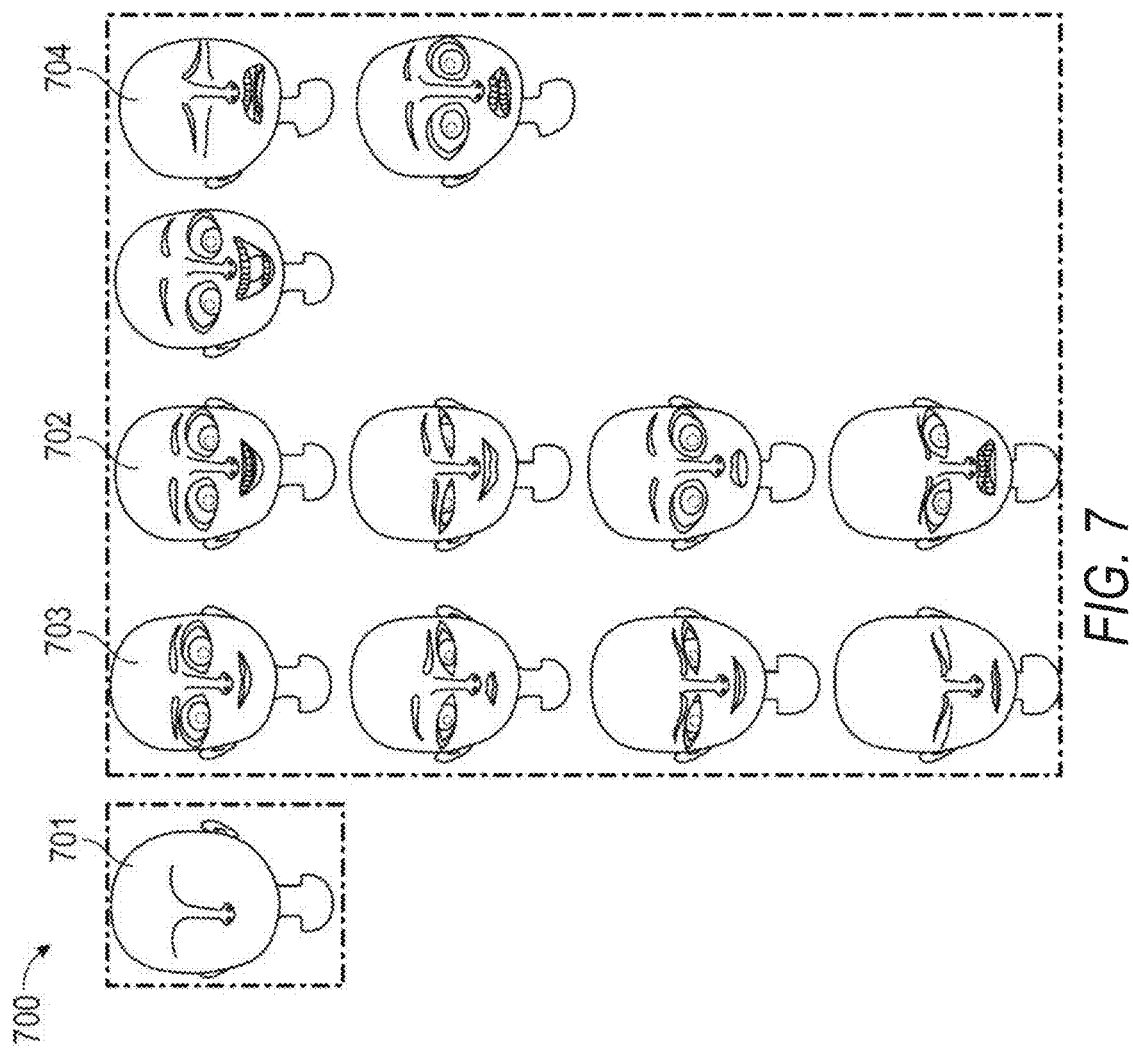
FIG. 7 shows illustrative facial textures featuring different expressions in a second level of detail according to some embodiments.

FIG. 7 shows illustrative facial textures 700 featuring different expressions in the second level of detail according to some embodiments. For example, different two-dimensional facial textures 703, 702 and 704, in a reduced level of detail relative to a first level of detail, may be assembled onto a three-dimensional head 701 to generate an avatar with reduced level of detail. In some implementations, the facial textures in the first level of detail and the reduced level of detail are both two-dimensional, but the reduced level of detail facial textures have reduced image quality relative to the first level of detail. In some implementations, the first level of detail facial textures are three-dimensional and are converted to two-dimensional facial textures to reduce the level of detail.

Facial texture 702 represents a two-dimensional expression in which lips are curved or raised up. Facial texture 703 represents a two-dimensional expression in which lips are in a neutral straight position. Facial texture 704 represents a two-dimensional expression in which lips are curved or pointing down. The avatar processing system 125 may receive a request from a game to animate a given avatar that is in a second level of detail that is lower than a first level of detail from happy to sad. In response, the avatar processing system 125 may identify an expression request that identifies a set of facial textures 700 and sequence for representing an animation from happy to sad. For example, the expression sequence may indicate that facial textures 703, 702 and 704 correspond to the requested expression and need to be presented in the following order: first facial texture 702, then facial texture 703, and then facial texture 704. The avatar processing system 125 may provide the three facial textures and the three-dimensional head 701 to the game along with other textures and components and the sequence for presenting the facial textures. The game may then animate the requested expression from happy to sad by swapping facial texture 702 with facial texture 703 followed by swapping facial texture 703 with facial texture 704, according to the specified sequence. Alternatively, the avatar processing system 125 may assemble the avatar with the different facial textures according to the specified sequence and provide to the game the avatar with updated facial textures as the different facial textures are swapped to animate the avatar expression.

Figure 8:
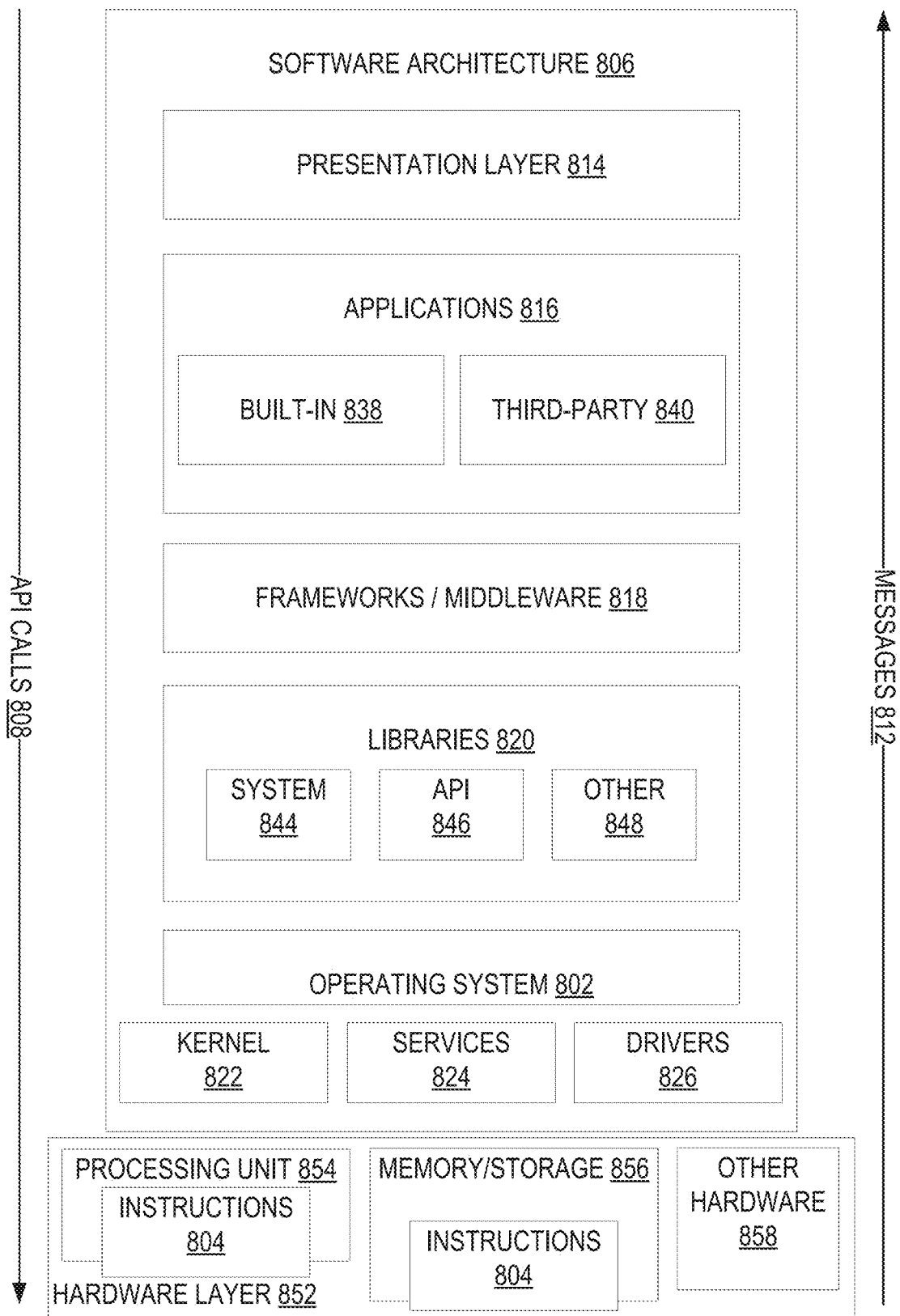
FIG. 8 is a block diagram illustrating a representative software architecture, which may be used in conjunction with various hardware architectures herein described, according to example embodiments.

FIG. 8 is a block diagram illustrating an example software architecture 806, which may be used in conjunction with various hardware architectures herein described. FIG. 8 is a non-limiting example of a software architecture 806 and it will be appreciated that many other architectures may be implemented to facilitate the functionality described herein. The software architecture 806 may execute on hardware such as machine 900 of FIG. 9 that includes, among other things, processors 904, memory 914, and input/output (I/O) components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components, and so forth described herein. The hardware layer 852 also includes memory and/or storage modules memory/storage 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke API calls 808 through the software stack and receive messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphic UI (GUI) functions, high-level resource management, high-level location services, and so forth. The frameworks/middleware 818 may provide a broad spectrum of other APIs that may be utilized by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built-in operating system functions (e.g., kernel 822, services 824, and/or drivers 826), libraries 820, and frameworks/middleware 818 to create UIs to interact with users of the system. Alternatively, or additionally, in some systems, interactions with a user may occur through a presentation layer, such as presentation layer 814. In these systems, the application/component "logic" can be separated from the aspects of the application/component that interact with a user.

Figure 9:
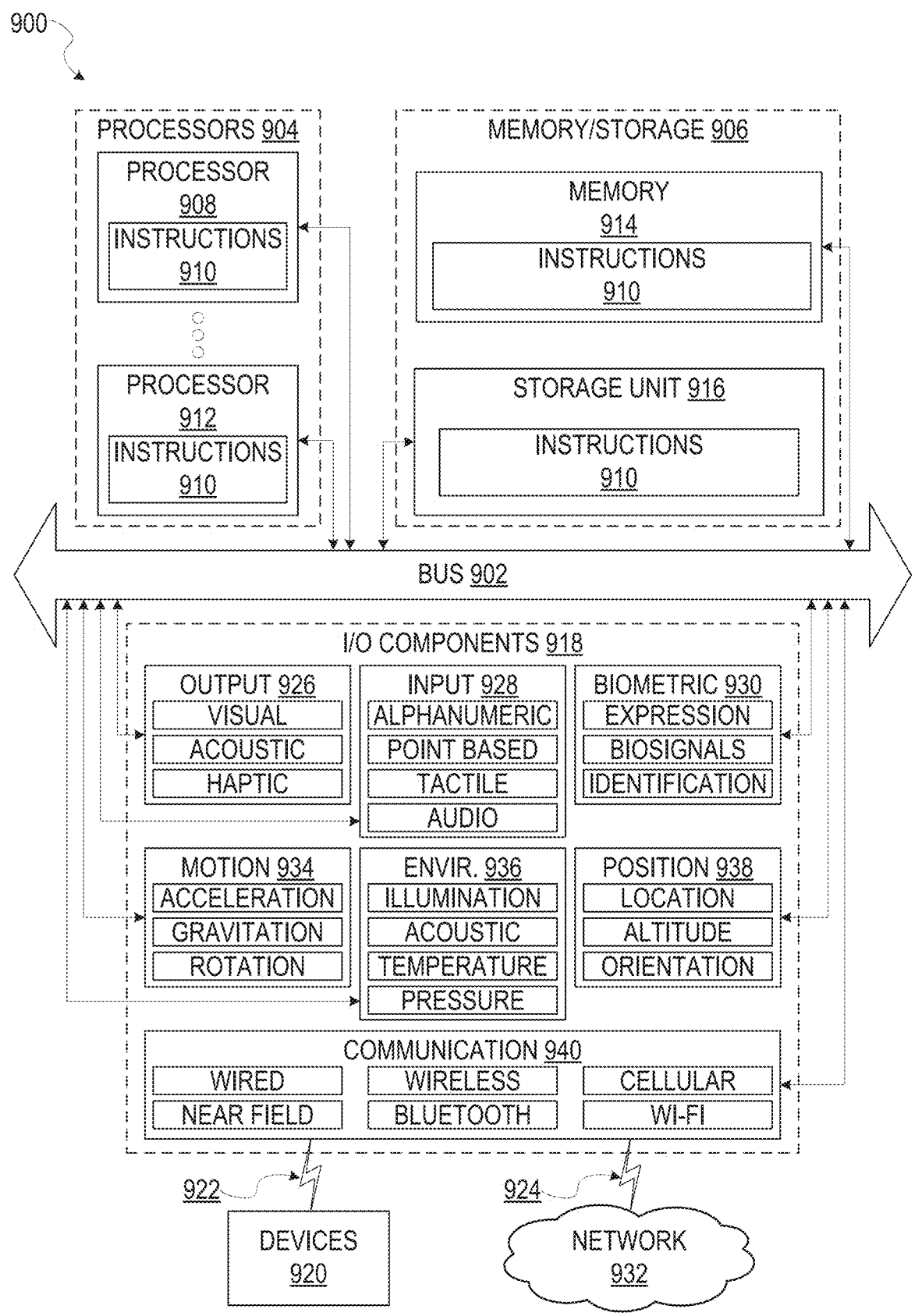
FIG. 9 is a block diagram illustrating components of a machine able to read instructions from a machine-readable medium (e.g., a machine-readable storage medium) and perform any one or more of the methodologies discussed herein, according to example embodiments.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory/storage 906, and I/O components 918, which may be configured to communicate with each other such as via a bus 902. In an example embodiment, the processors 904 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 908 and a processor 912 that may execute the instructions 910. The term "processor" is intended to include multi-core processors 904 that may comprise two or more independent processors (sometimes referred to as "cores") that may execute instructions 910 contemporaneously. Although FIG. 9 shows multiple processors 904, the machine 900 may include a single processor with a single core, a single processor with multiple cores (e.g., a multi-core processor), multiple processors with a single core, multiple processors with multiple cores, or any combination thereof.

The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 924 and coupling 922, respectively. For example, the communication components 940 may include a network interface component or other suitable device to interface with the network 932. In further examples, communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop. PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points. APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein. "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code,", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   storing in a database a first avatar having a first level of detail, the first avatar including a first plurality of components;
   reducing a level of detail of each of the first plurality of components separately from each other;
   storing a second plurality of components comprising the reduced level of detail of each of the first plurality of components;
   receiving a request for the first avatar in a second level of detail that comprises a lower level of detail than the first level of detail;

in response to receiving the request, assembling the second plurality of components to generate a second avatar having the second level of detail;

determining a first identity of a first user associated with the second avatar and a second identity of a second user associated with a third avatar; and based on the determined first identity and the determined second identity, displaying the second avatar having the second level of detail together with a third avatar having the first level of detail.

2. The method of claim 1, wherein the second identity indicates that the user is a leader in a game, further comprising causing the third avatar with a greater level of detail than the second avatar to be presented with the second avatar for the leader in the game, wherein each of the first and second plurality of components includes at least one of a rig, a geometric model, or at least one texture, wherein the rig includes a skeleton with a plurality of bones that defines how the bones move relative to each other, and wherein the geometric model includes a plurality of triangles representing a surface of a corresponding avatar.

3. The method of claim 2, wherein reducing the level of detail comprises reducing the rig of the first avatar from having 216 bones to 16 bones separately from the geometric model or the at least one texture of the first avatar.

4. The method of claim 2, wherein reducing the level of detail comprises reducing the number of triangles in the geometric model of the first avatar from 10000 triangles to 2000 triangles separately from the rig or the at least one texture of the first avatar.

5. The method of claim 2, wherein reducing the level of detail comprises down sampling, resizing, and quantizing at least one texture of the first avatar separately from the rig or the geometric model of the first avatar.

6. The method of claim 2 further comprising maintaining same names of bones common to a rig of the first plurality of components and a rig of the second plurality of components.

7. The method of claim 1 further comprising animating the second avatar by:

retrieving a first facial texture of the first avatar in the second level of detail;

retrieving a second facial texture of the first avatar in the second level of detail; and assembling the second avatar using the first facial texture, wherein the first facial texture in the assembled second avatar is swapped with the second facial texture during display of the second avatar to animate the second avatar.

8. The method of claim 7 further comprising:

receiving a request for an expression associated with the second avatar; and determining a sequence of facial textures associated with the expression includes the first facial texture followed by the second facial texture, wherein the swapping results in a change in expression represented by the second avatar from a given expression to the requested expression.

9. The method of claim 7; wherein the second avatar is a three-dimensional avatar and the first and second facial textures are two-dimensional textures.

10. The method of claim 1 further comprising presenting the first avatar in a messaging application and presenting the second avatar in a gaming application.

11. The method of claim 1 further comprising reducing a level of detail of a third plurality of components associated with a collection of avatars.

12. The method of claim 1 further comprising presenting a plurality of avatars, including the second avatar, in the second level of detail, wherein the plurality of avatars are presented in different levels of detail based on priority associated with the plurality of avatars.

13. The method of claim 1, wherein the second avatar is generated in response to receiving the request for the first avatar in the second level of detail and in response to determining that the second avatar having the second level of detail has not been previously generated.

14. The method of claim 1, wherein reducing the level of detail comprises associating less than all of a rig of the first avatar with a texture of the first avatar.

15. The method of claim 14 further comprising associating only a head joint of the rig of the first avatar with at least one of facial hair; hair, a hat, or glasses of the first avatar.

16. The method of claim 14 further comprising assembling a third avatar using portions of the rig of the first avatar for which the level of detail was reduced.

17. A system comprising:

a processor configured to perform operations comprising:

storing in a database a first avatar having a first level of detail; the first avatar including a first plurality of components;

reducing a level of detail of each of the first plurality of components separately from each other;

storing a second plurality of components comprising the reduced level of detail of each of the first plurality of components;

receiving a request for the first avatar in a second level of detail that comprises a lower level of detail than the first level of detail;

in response to receiving the request, assembling the second plurality of components to generate a second avatar having the second level of detail;

determining a first identity of a first user associated with the second avatar and a second identity of a second user associated with a third avatar; and based on the determined first identity and the determined second identity, displaying the second avatar having the second level of detail together with a third avatar having the first level of detail.

18. The system of claim 17, wherein the operations further comprise operations for animating the second avatar by:

retrieving a first facial texture of the first avatar in the second level of detail;

retrieving a second facial texture of the first avatar in the second level of detail; and assembling the second avatar using the first facial texture, wherein the first facial texture in the assembled second avatar is swapped with the second facial texture during display of the second avatar to animate the second avatar.

19. The method of claim 18, wherein the operations further comprise:

receiving a request for an expression associated with the second avatar; and determining a sequence of facial textures associated with the expression includes the first facial expression followed by the second facial expression, wherein the swapping results in a change in expression represented by the second avatar from a given expression to the requested expression.

20. A non-transitory machine-readable storage medium that includes instructions that, when executed by one or more processors of a machine, cause the machine to perform operations comprising:

storing in a database a first avatar having a first level of detail, the first avatar including a first plurality of components;

reducing a level of detail of each of the first plurality of components separately from each other;

storing a second plurality of components comprising the reduced level of detail of each of the first plurality of components;

receiving a request for the first avatar in a second level of detail that comprises a lower level of detail than the first level of detail;

in response to receiving the request, assembling the second plurality of components to generate a second avatar having the second level of detail;

determining a first identity of a first user associated with the second avatar and a second identity of a second user associated with a third avatar; and based on the determined first identity and the determined second identity, displaying the second avatar having the second level of detail together with a third avatar having the first level of detail.

\* \* \* \* \*

UNITED STATES PATENT AND TRADEMARK OFFICE
CERTIFICATE OF CORRECTION

PATENT NO. : 10,872,451 B2
APPLICATION NO. : 16/177325
DATED : December 22, 2020
INVENTOR(S) : Sheth et al.

Page 1 of 1

It is certified that error appears in the above-identified patent and that said Letters Patent is hereby corrected as shown below:

In the Claims

In Column 23, Line 59, in Claim 9, delete "claim 7;" and insert --claim 7,-- therefor In Column 24, Line 16, in Claim 15, delete "hair;" and insert --hair,-- therefor In Column 24, Line 23, in Claim 17, delete "detail;" and insert --detail,-- therefor Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*